US012585873B1

(12) United States Patent
Kim et al.

(10) Patent No.: US 12,585,873 B1
(45) Date of Patent: Mar. 24, 2026

(54) SYSTEM AND METHOD FOR SHORT TEXT MATCHING

(71) Applicant: Intuit Inc., Mountain View, CA (US)

(72) Inventors: Aleksandr Kim, London (GB); Rineke van Noort, London (GB); Yuting Lu, London (GB); Ben Yi, Rhodes (AU)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/224,535

(22) Filed: May 30, 2025

(51) Int. Cl.
*G06F 40/242* (2020.01)
*G06F 40/284* (2020.01)
*G06N 3/04* (2023.01)

(52) U.S. Cl.
CPC .......... *G06F 40/242* (2020.01); *G06F 40/284* (2020.01); *G06N 3/04* (2013.01)

(58) Field of Classification Search
CPC ........ G06F 40/242; G06F 40/284; G06N 3/04
USPC ............................................. 704/9
See application file for complete search history.

(56) References Cited

U.S. PATENT DOCUMENTS

| | | | | |
|---|---|---|---|---|
| 5,040,226 A | * | 8/1991 | Elischer | G06Q 20/042 |
| | | | | 382/175 |
| 7,702,508 B2 | * | 4/2010 | Bennett | G06F 16/24522 |
| | | | | 704/270.1 |
| 7,966,329 B1 | * | 6/2011 | Rukonic | G06Q 40/02 |
| | | | | 707/950 |
| 8,639,497 B2 | * | 1/2014 | Eggebraaten | G06F 40/40 |
| | | | | 704/9 |
| 8,661,038 B1 | * | 2/2014 | Whittam | G06F 16/9537 |
| | | | | 705/45 |

(Continued)

FOREIGN PATENT DOCUMENTS

| | | | | |
|---|---|---|---|---|
| CA | 106528642 A | | 3/2017 | |
| CN | 113326380 A | * | 8/2002 | ............. G06N 3/045 |

(Continued)

OTHER PUBLICATIONS

Amur et al. "Short-text semantic similarity (stss): Techniques, challenges and future perspectives," Applied Sciences 13.6 (2023): 3911 (Year: 2023).

(Continued)

*Primary Examiner* — Edwin S Leland, III
(74) *Attorney, Agent, or Firm* — Paradice & Li LLP

(57) ABSTRACT

A short text matching system and method includes pre-generated dictionary of n-gram tokens having a selected length and corresponding embeddings produced by a fine-tuned transformer model and further includes a one-layer transformer model for inference. The dictionary is produced by fine-tuning a pretrained transformer model based on a domain specific short text training dataset. The length of the n-gram tokens is selected based on the dependency of the variance of embeddings on the n-gram length for embeddings produced by the fine-tuned transformer model. Domain specific input text, including query text and target text, are received and n-gram tokens of the selected length are produced. Embeddings corresponding to each of the n-gram tokens are determined from the dictionary along with corresponding positional embeddings. The n-gram embeddings and positional embeddings are provided to the one-layer transformer model, which produces a text matching result, such as similarity score or classification.

20 Claims, 6 Drawing Sheets

(56) References Cited

U.S. PATENT DOCUMENTS

| | | | | |
|---|---|---|---|---|
| 8,666,976 | B2 * | 3/2014 | Merz | G06F 16/3347 |
| | | | | 707/727 |
| 9,152,623 | B2 * | 10/2015 | Wroczyński | G06F 40/284 |
| 10,628,525 | B2 * | 4/2020 | Fink | G06V 30/40 |
| 11,250,517 | B1 * | 2/2022 | Frohwein | G06Q 40/12 |
| 11,748,571 | B1 * | 9/2023 | Glavaš | G06F 40/289 |
| | | | | 704/9 |
| 2009/0222364 | A1 * | 9/2009 | McGlynn | G06Q 40/12 |
| | | | | 705/30 |
| 2010/0063948 | A1 * | 3/2010 | Virkar | G06N 20/10 |
| | | | | 707/769 |
| 2011/0040553 | A1 * | 2/2011 | Sasivarman | G06F 40/30 |
| | | | | 704/9 |
| 2012/0265655 | A1 * | 10/2012 | Stroh | G06Q 40/00 |
| | | | | 705/30 |
| 2012/0271827 | A1 * | 10/2012 | Merz | G06F 16/90344 |
| | | | | 707/E17.089 |
| 2013/0346424 | A1 * | 12/2013 | Zhang | G06F 16/313 |
| | | | | 707/750 |
| 2014/0279299 | A1 * | 9/2014 | Erenrich | G06Q 40/02 |
| | | | | 705/30 |
| 2016/0085742 | A1 * | 3/2016 | Mahmud | G06F 40/289 |
| | | | | 704/9 |
| 2017/0116519 | A1 * | 4/2017 | Johnson | G06N 3/08 |
| 2018/0268065 | A1 * | 9/2018 | Parepally | G06N 20/00 |
| 2018/0300608 | A1 * | 10/2018 | Sevrens | G06N 3/044 |
| 2018/0365322 | A1 * | 12/2018 | Hou | G06N 20/10 |
| 2019/0034591 | A1 * | 1/2019 | Mossin | G06N 3/045 |
| 2020/0098053 | A1 * | 3/2020 | Lesner | G06N 3/09 |
| 2020/0117856 | A1 * | 4/2020 | Kumar Karn | G06N 3/044 |
| 2020/0402230 | A1 * | 12/2020 | Schmidt | G06V 10/776 |

FOREIGN PATENT DOCUMENTS

| | | | | | |
|---|---|---|---|---|---|
| CN | 102682248 | A | * | 9/2012 | |
| CN | 102682248 | B | * | 1/2015 | |
| CN | 106528642 | A | * | 3/2017 | G06F 16/355 |
| CN | 113326374 | A | * | 8/2021 | G06N 3/045 |
| CN | 113378567 | A | * | 9/2021 | G06N 3/045 |
| CN | 113535961 | A | * | 10/2021 | G06N 3/047 |
| CN | 112906397 | B | * | 11/2021 | G06N 3/044 |
| CN | 113761935 | A | * | 12/2021 | G06N 3/045 |
| CN | 114781997 | A | * | 7/2022 | G06F 18/2415 |
| CN | 116502628 | A | * | 7/2023 | G06F 40/232 |
| CN | 116628172 | A | * | 8/2023 | G06F 16/3329 |
| CN | 117875323 | A | * | 4/2024 | G06N 5/022 |
| CN | 114492412 | B | * | 10/2024 | G06F 40/216 |
| CN | 120343349 | A | * | 7/2025 | H04N 21/4312 |

OTHER PUBLICATIONS

Arts et al., "Natural language processing to identify the creation and impact of new technologies in patent text: Code, data, and new measures," Research policy 50.2 (2021): 104144 (Year: 2021).

Aslanyan, "Announcing the Patent Phrase Similarity Dataset," Google Research, Published Aug. 31, 2022, retrived from the web on May 7, 2025 at URL: https://research.google/blog/announcing-the-patent-phrase-similarity-dataset/.

Jiang et al., "Natural Language Processing in Patents: A Survey," arXiv preprint arXiv:2403.04105, pp. 44 (Year: 2024).

Jiang et al., "Natural Language Processing in Patents: A Survey," Artificial Intelligence Review (2025) 58:214, Published online Apr. 22, 2025, pp. 62 (Year: 2025).

Lan, "Research on Text Similarity Measurement Hybrid Algorithm with Term Semantic Information and TF-IDF Method," Advances in Multimedia 2022.1 (2022): 7923262 (Year: 2022).

Folkestad et al. "Automatic Classification of Bank Transactions", Norwegian University of Science and Technology Department of Computer Science, Jun. 2017 (Year: 2017).

Haas et al. ("Identifying Financial Institutions by Transaction Signatures", arXiv: 1808.00151v1 [cs.CY], Jul. 23, 2018, 4 pages.

International Search Report and Written Opinion dated Nov. 19, 2019, from PCT/US2019/044182.

Gangeh et al., "Supervised Dictionary Learning and Sparse Representation—A Review Big Data Analytics, Bioinformatics, and Computational Biology View Project Design and Development of Computer Aided Theragnosis Systems View Project," Feb. 27, 2015, XP055920193, URL: https://arxiv.org/pdf/1502.05928.

Search Report dated May 20, 2022, from EP Application No. 19867955.7-1218.

* cited by examiner

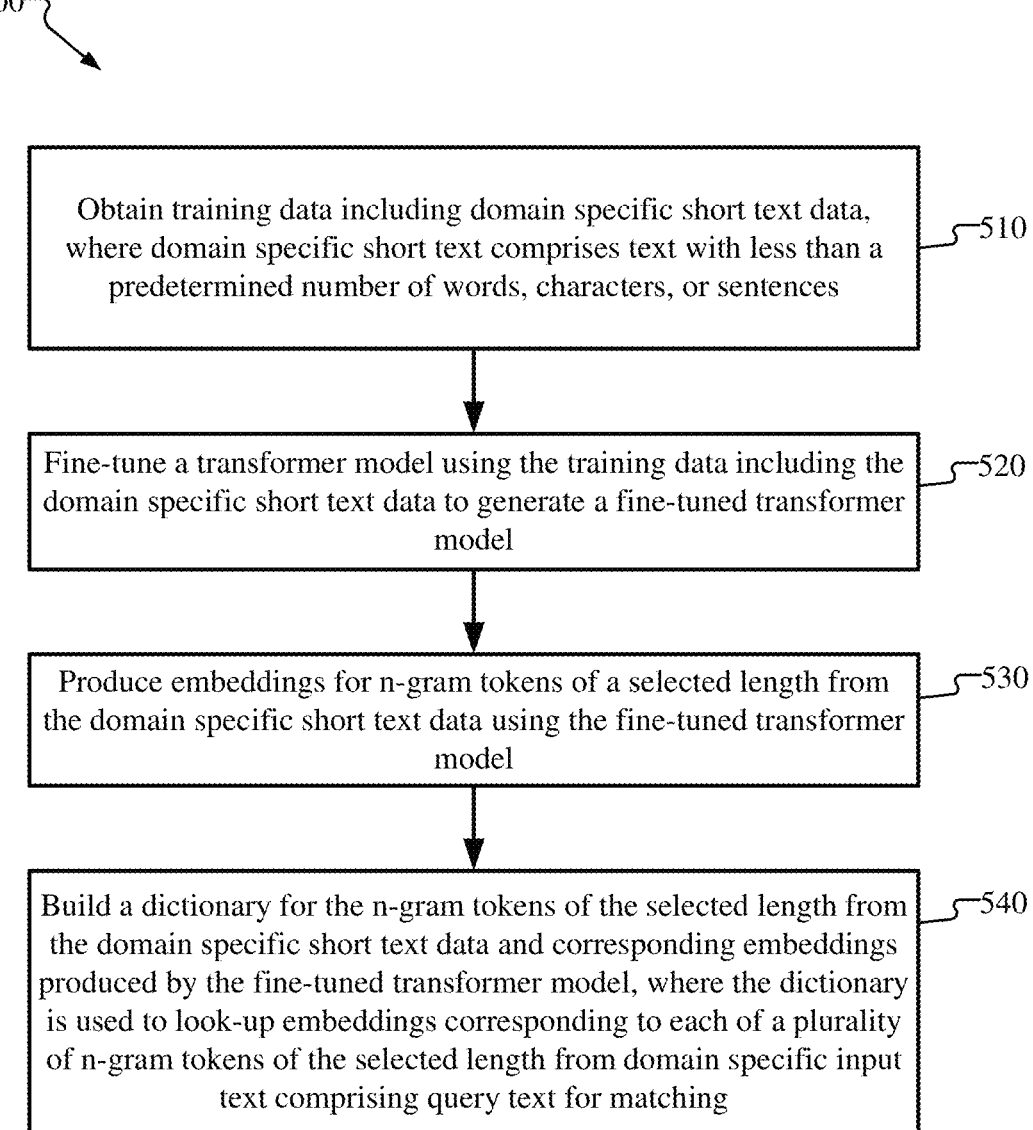

500

Obtain training data including domain specific short text data, where domain specific short text comprises text with less than a predetermined number of words, characters, or sentences — 510

Fine-tune a transformer model using the training data including the domain specific short text data to generate a fine-tuned transformer model — 520

Produce embeddings for n-gram tokens of a selected length from the domain specific short text data using the fine-tuned transformer model — 530

Build a dictionary for the n-gram tokens of the selected length from the domain specific short text data and corresponding embeddings produced by the fine-tuned transformer model, where the dictionary is used to look-up embeddings corresponding to each of a plurality of n-gram tokens of the selected length from domain specific input text comprising query text for matching — 540

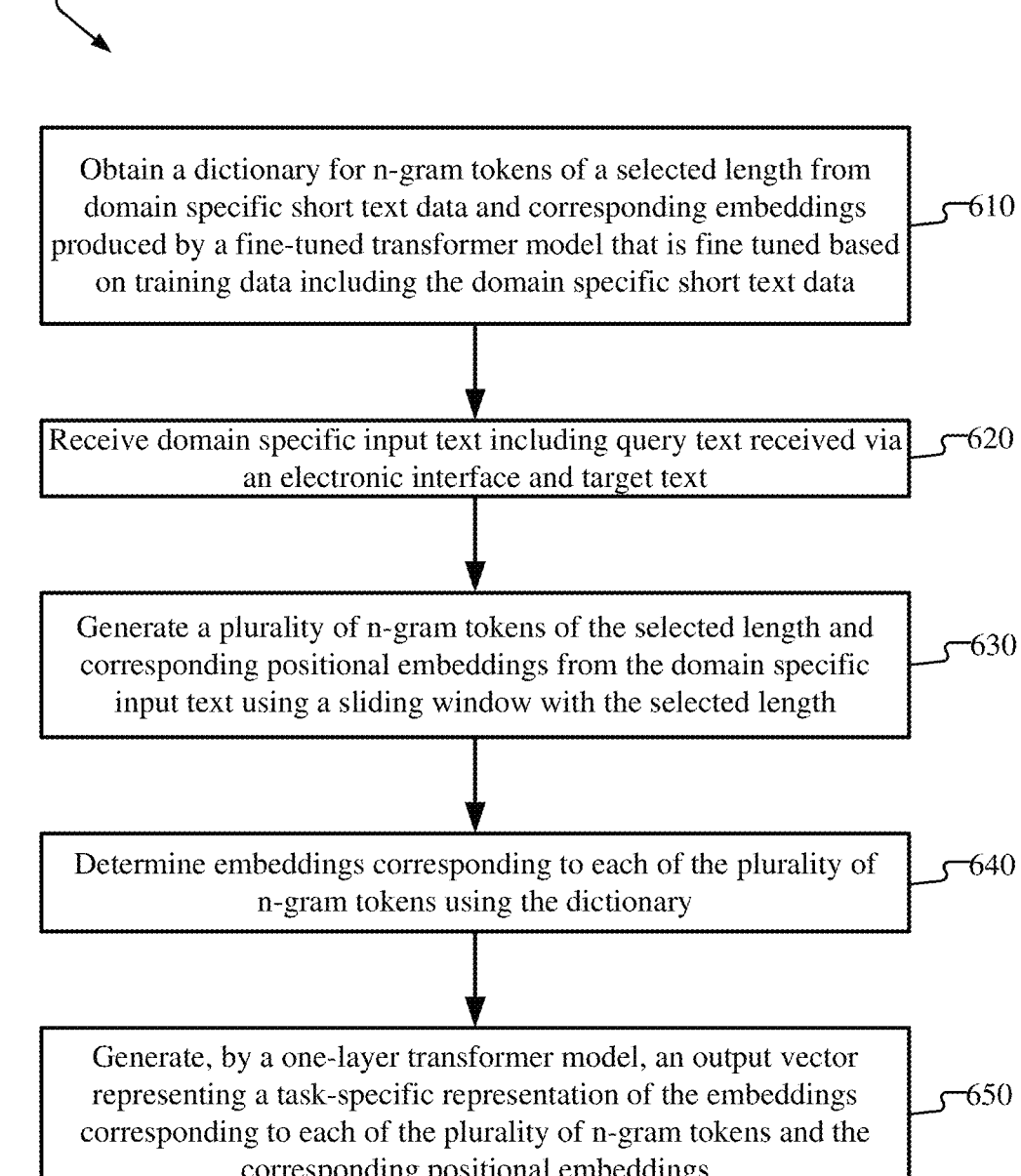

Obtain a dictionary for n-gram tokens of a selected length from domain specific short text data and corresponding embeddings produced by a fine-tuned transformer model that is fine tuned based on training data including the domain specific short text data          610

Receive domain specific input text including query text received via an electronic interface and target text          620

Generate a plurality of n-gram tokens of the selected length and corresponding positional embeddings from the domain specific input text using a sliding window with the selected length          630

Determine embeddings corresponding to each of the plurality of n-gram tokens using the dictionary          640

Generate, by a one-layer transformer model, an output vector representing a task-specific representation of the embeddings corresponding to each of the plurality of n-gram tokens and the corresponding positional embeddings          650

FIG. 6

SYSTEM AND METHOD FOR SHORT TEXT MATCHING

TECHNICAL FIELD

The present disclosure relates generally to natural language processing (NLP), and more specifically, to systems and methods for text analytics including short text matching.

BACKGROUND

Short text matching is an important task in natural language processing applications, such as search query matching, social media text analysis, and messaging platforms. Short text matching, for example, involves the determination of semantic similarity or relevance between concise text segments, such as sentences, phrases, or queries, typically including, e.g., fewer than 50 words.

Large language models (LLMs) such as BERT (Bidirectional Encoder Representations from Transformers) and RoBERTa (robustly optimized BERT approach), and other sentence transformers, transform text into dense vector representations, referred to as embeddings, which capture semantic and contextual information. The embeddings may then be compared using metrics such as cosine similarity to quantify the similarity for text matching. Sophisticated transformer based models, such as BERT, generally provide good textual understanding, but suffer challenges in achieving robust and efficient short text matching.

One challenge is the inherent ambiguity in short texts due to their limited context. The short length of these texts results in limited semantic information and high word ambiguity, making it challenging for traditional machine learning models to produce precise embeddings. This issue is exacerbated in domain-specific applications, such as medical, financial, or patent domains, that use specialized terminology. Another challenge is computational efficiency and speed. Generating embeddings for large datasets, as required in real-time applications, is computationally expensive and relatively slow. Bi-encoders, which encode texts independently, offer efficiency but may sacrifice accuracy compared to cross-encoders, which process text pairs jointly but are slower and less scalable. Balancing accuracy and computational cost remains a significant hurdle. Accordingly, there remains a need for improved systems and methods for short text matching that overcome such challenges.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods, and devices of this disclosure each have several innovative aspects, no single one of which is solely responsible for the desirable attributes disclosed herein.

As discussed herein, a short text matching system and method utilizes a pre-generated dictionary of n-gram tokens having a selected length and corresponding embeddings produced by a fine-tuned transformer model and further utilizes a one-layer transformer model for inference. The dictionary is generated using a fine-tuned transformer model, which is fine-tuned based on a domain specific short text training dataset. The selected length of the n-gram tokens may be determined using the fine-tuned transformer model based on the dependency of the variance of embeddings on the n-gram lengths for embeddings of different n-gram lengths produced by the fine-tuned transformer model. The domain specific short text training dataset is tokenized into n-gram tokens of the selected length and corresponding embeddings are determined by the fine-tuned transformer model, which are then stored in the dictionary. Domain specific input text, including query text and target text, are received by the system, and n-gram tokens of the selected length are produced. Embeddings corresponding to each of the n-gram tokens for the input text are determined using the dictionary along with determining corresponding positional embeddings. The n-gram embeddings and positional embeddings are then provided to the one-layer transformer model, which produces a text matching result, such as similarity score or classification.

One innovative aspect of the subject matter described in this disclosure can be implemented as a method configured for matching domain specific short text. The method includes obtaining training data including domain specific short text data, where domain specific short text comprises text with less than a predetermined number of words, characters, or sentences. The method further includes fine-tuning a transformer model using the training data comprising the domain specific short text data to generate a fine-tuned transformer model and producing embeddings for n-gram tokens of a selected length from the domain specific short text data using the fine-tuned transformer model. The method further includes building a dictionary for the n-gram tokens of the selected length from the domain specific short text data and corresponding embeddings produced by the fine-tuned transformer model, wherein the dictionary is used to look-up embeddings corresponding to each of a plurality of n-gram tokens of the selected length from domain specific input text comprising query text for matching.

One innovative aspect of the subject matter described in this disclosure can be implemented as a system for matching domain specific short text that includes one or more processors, and a memory coupled to the one or more processors and storing instructions that, when executed by the one or more processors, cause the system to obtain training data comprising domain specific short text data, wherein domain specific short text comprises text with less than a predetermined number of words, characters, or sentences. The system fine tunes a transformer model using the training data comprising the domain specific short text data to generate a fine-tuned transformer model and produce embeddings for n-gram tokens of a selected length from the domain specific short text data using the fine-tuned transformer model. The system further builds a dictionary for the n-gram tokens of the selected length from the domain specific short text data and corresponding embeddings produced by the fine-tuned transformer model, wherein the dictionary is used to look-up embeddings corresponding to each of a plurality of n-gram tokens of the selected length from domain specific input text comprising query text for matching.

One innovative aspect of the subject matter described in this disclosure can be implemented as a method configured for short text matching. The method includes obtaining a dictionary for n-gram tokens of a selected length from domain specific short text data and corresponding embeddings produced by a fine-tuned transformer model. The fine-tuned transformer model is fine-tuned based on training data including the domain specific short text data, where domain specific short text includes text with less than a predetermined number of words, characters, or sentences. The method includes receiving domain specific input text including query text received via an electronic interface and target text. A plurality of n-gram tokens of the selected length and corresponding positional embeddings from the domain specific input text are generated using a sliding window with the selected length, and embeddings corresponding to each of the plurality of n-gram tokens are determined using the dictionary. The method includes generating, by a one-layer transformer model, an output vector representing a task-specific representation of the embeddings corresponding to each of the plurality of n-gram tokens and the corresponding positional embeddings.

One innovative aspect of the subject matter described in this disclosure can be implemented as a system of short text matching that includes one or more processors, and a memory coupled to the one or more processors and storing instructions that, when executed by the one or more processors, cause the system to obtain a dictionary for n-gram tokens of a selected length from domain specific short text data and corresponding embeddings produced by a fine-tuned transformer model. The fine-tuned transformer model is fine-tuned based on training data including the domain specific short text data, where domain specific short text includes text with less than a predetermined number of words, characters, or sentences. The system is further caused to receive domain specific input text including query text received via an electronic interface and target text. The system is further caused to generate a plurality of n-gram tokens of the selected length and corresponding positional embeddings from the domain specific input text using a sliding window with the selected length and to determine embeddings corresponding to each of the plurality of n-gram tokens using the dictionary. The system is further caused to generate, by a one-layer transformer model, an output vector representing a task-specific representation of the embeddings corresponding to each of the plurality of n-gram tokens and the corresponding positional embeddings.

Details of one or more implementations of the subject matter described in this disclosure are set forth in the accompanying drawings and the description below. Other features, aspects, and advantages will become apparent from the description, the drawings, and the claims. Note that the relative dimensions of the following figures may not be drawn to scale.

BRIEF DESCRIPTION OF THE DRAWINGS

FIG. 5 shows an illustrative flowchart depicting an example method for matching domain specific short text, according to some implementations.

FIG. 6 illustrates a flowchart depicting a method for short text matching, according to some implementations.

Like reference numbers and designations in the various drawings indicate like elements.

DETAILED DESCRIPTION

Figure 1:
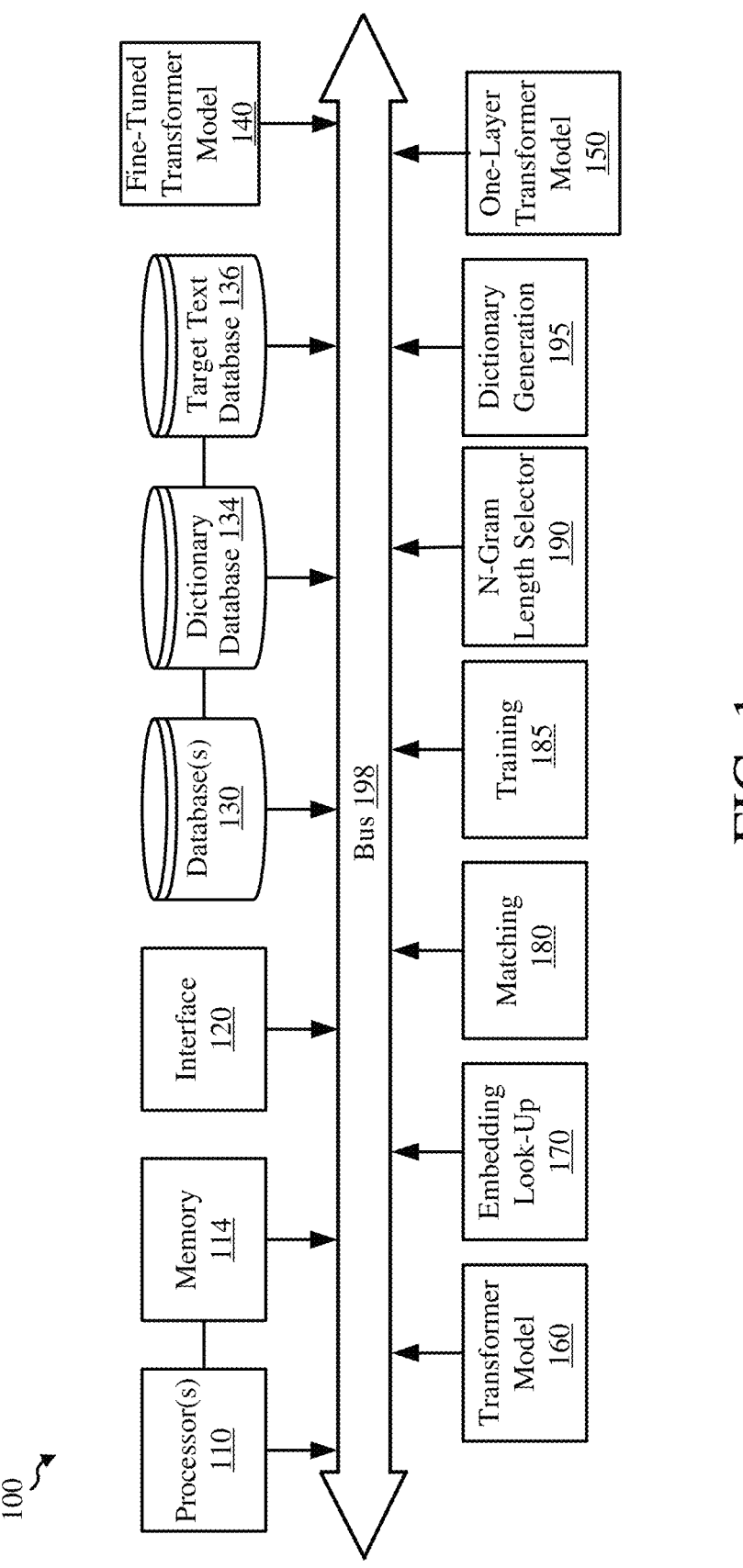
FIG. 1 illustrates a system for short text matching, according to some implementations.

A natural language processing model may be used for short text matching applications. The system and method, as discussed herein, uses a dictionary for domain specific short text data in which n-gram tokens of a selected length are stored with associated embeddings. The dictionary, for example, may be generated by fine-tuning a large transformer model on the domain specific short text data, selecting the n-gram length, and producing and storing the embeddings from the fine-tuned large transformer model with the associated n-gram tokens. The use of the dictionary for the domain specific short text data enables fast generation of context-rich embeddings for tokens with the n-gram length from domain specific input data. The embeddings and positional embeddings from the input data are provided to a simplified transformer model with one attention layer for computationally efficient and accurate text matching. As discussed herein, system and method for short text matching overcomes limitations in existing approaches.

Classic models, such as Bag of Words (BoW), are one approach for short text matching, e.g., used before the advent of deep learning and transformer-based large language models (LLMs). These methods, for example, typically rely on relatively simple, statistical, or rule-based techniques to represent and compare short texts. For example, the BoW model represents a text as an unordered collection, e.g., "bag," of words, and ignores semantic information. The classic models struggle to capture context and, accordingly, suffer from semantic ambiguity and domain-specific nuances. With the advent of LLMs, such as BERT and RoBERTa, and other sentence transformers, text may be transformed into dense vector representations, or embeddings, that capture semantic and contextual information. While transformer based models provide contextual advantages, they are computationally expensive and slow for large-scale inference.

Precise text matching is crucial for many domain specific applications, such as healthcare and medical research, finance and banking, customer service and support, etc., for tasks such as clinical decision support, fraud detection, account reconciliation, customer transaction categorization and the like. These applications require efficient and accurate natural language processing capable of handling high volumes. While light weight classic models are fast, due to limited semantic information they cannot adequately capture context necessary for the necessary accuracy in many application. Moreover, while sophisticated transformer based models, such as BERT, may provide better contextual understanding, they are often too slow for real-time inference, which is critical for processing high volumes of transactions in many application.

To address the limitations of existing approaches, a system is configured for domain specific short text matching using a pre-generated dictionary of embeddings for n-gram tokens of a selected length produced with a transformer model that is fine-tuned for domain specific short text, and using a lightweight one-layer transformer model for inference to achieve both speed and accuracy in short text matching. This hybrid approach addresses the specific needs of high volume, precision dependent, domain specific short text matching applications.

Various implementations of the subject matter disclosed herein provide one or more technical solutions to the technical problem of improving the functionality (e.g., speed, accuracy, computational efficiency, etc.) of computer-based systems, where the one or more technical solutions can be practically applied to improve existing techniques for text matching. Implementations of the subject matter disclosed herein provide specific inventive steps describing how desired results are achieved and realize meaningful and significant improvements on existing computer functionality, that is, the performance of computer-based systems operating in the evolving technological field of text matching. For example, the use of a pre-generated dictionary for embeddings for n-gram tokens of a selected length that are produced with a fine-tuned transformer model that is fine-tuned for domain specific short text, along with the use of positional embeddings, and a lightweight one-layer transformer model for inference reduces computational complexity along with attendant power and time demands relative to classic models and transformer-based LLMS, while enabling fast and highly accurate domain specific short text matching needed for high volume applications.

FIG. 1 shows a system 100 for short text matching, according to some implementations. Various aspects of the system 100 disclosed herein are generally applicable for domain specific short text matching at high speed and with little computational cost. The system 100 includes a combination of one or more processors 110, a memory 114 coupled to the one or more processors 110, an interface 120, one or more databases 130, a dictionary database 134, a target text database 136, a fine-tuned transformer model 140, a one-layer transformer model 150, a transformer model 160, an embedding look-up module 170, a matching module 180, a training module 185, an n-gram length selector module 190, and a dictionary generation module 195. In some implementations, the various components of the system 100 are interconnected by at least a data bus 198. In some other implementations, the various components of the system 100 are interconnected using other suitable signal routing resources.

The processor 110 includes one or more suitable processors capable of executing scripts or instructions of one or more software programs stored in the system 100, such as within the memory 114. In some implementations, the processor 110 includes a general-purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In some implementations, the processor 110 includes a combination of computing devices, such as a combination of a DSP and a microprocessor, a plurality of microprocessors, one or more microprocessors in conjunction with a DSP core, or any other suitable configuration. In some implementations, the processor 110 incorporates one or more graphics processing units (GPUs) and/or tensor processing units (TPUs), such as for processing a large amount of data.

The memory 114, which may be any suitable persistent memory (such as non-volatile memory or non-transitory memory) may store any number of software programs, executable instructions, machine code, algorithms, and the like that can be executed by the processor 110 to perform one or more corresponding operations or functions. In some implementations, hardwired circuitry is used in place of, or in combination with, software instructions to implement aspects of the disclosure. As such, implementations of the subject matter disclosed herein are not limited to any specific combination of hardware circuitry and/or software.

The interface 120 is one or more input/output (I/O) interfaces for transmitting or receiving (e.g., over a communications network) transmissions, input data, and/or instructions to or from a computing device of a user, outputting data (e.g., over the communications network) to the computing device of the user, providing an input interface for the user and outputting results to the computing device of the user, and the like. Specifically, the interface 120 may be used to receive query text from users and/or applications and to provide results to external applications or users. The query text may be the domain specific short text to be matched, which may originate from a person or from a separate system or application. For example, the interface 120 may be used to receive and transmit transmissions (e.g., including the query text or results of the text matching task) over the communications network from a computing device associated with the user or application. The interface 120 may also be used to provide or receive other suitable information, such as computer code for updating one or more programs stored on the system 100, internet protocol requests and results, or the like. The interface 120, for example, may be used to provide a corpus of data, e.g., domain specific short text, that may be used to refine a pretrained transformer model to produce the fine-tuned the transformer model 140 and/or used as target text to be matched with the query text, and may be stored in the database 130 or the target text database 136. An example interface includes a wired interface or wireless interface to the internet or other means to communicatively couple with user devices or any other suitable devices. In an example, the interface 120 includes an interface with an ethernet cable to a modem, which is used to communicate with an internet service provider (ISP) directing traffic to and from user devices and/or other parties. In some implementations, the interface 120 is also used to communicate with another device within the network to which the system 100 is coupled, such as a smartphone, a tablet, a personal computer, or other suitable electronic device. In various implementations, the interface 120 includes a display, a speaker, a mouse, a keyboard, or other suitable input or output elements that allow interfacing with the system 100 by a local user or moderator.

The database 130 stores data associated with the system 100, such as data objects, algorithms, weights, models, modules, engines, user information, values, ratios, historical data, recent data, current or real-time data, files, plugins, extracted data and/or metadata, arrays, tags, identifiers, prompts, queries, replies, feedback, insights, formats, characteristics, features, and/or components, among other suitable information, such as in one or more JavaScript Object Notation (JSON) files, comma-separated values (CSV) files, or other data objects for processing by the system 100, one or more Structured Query Language (SQL) compliant data sets for filtering, querying, and sorting by the system 100 (e.g., the processor 110), or any other suitable format. In various implementations, the database 130 is a part of or separate from the dictionary database 134, the target text database 136, and/or another suitable physical or cloud-based data store. In some implementations, the database 130 includes a relational database capable of presenting information as data sets in tabular form and capable of manipulating the data sets using relational operators.

The dictionary database 134 stores n-gram tokens of a selected length for domain specific short text data and corresponding embeddings produced by the fine-tuned transformer model 140 based on the domain specific short text data. The dictionary database 134, for example, may be a hash-map, with the n-gram tokens stored as keys and the corresponding embeddings stored as values. In various implementations, the dictionary database 134 may be a part of or separate from the database 130 and/or the target text database 136. In some instances, the dictionary database 134 includes data stored in one or more cloud object storage services, such as one or more Amazon Web Services (AWS)-based Simple Storage Service (S3) buckets, or any other desired storage services. In some implementations, all or a portion of the dictionary data may be temporarily stored in memory 114 or other database, such as database 130 and/or another suitable data store.

The target text database 136 stores domain specific short text data to which query text is to be matched. In some implementations, the target text may be domain specific short text that is from the same distribution as the training data used to refine the pretrained transformer model to produce the fine-tuned transformer model 140 and used for generating the dictionary data stored in the dictionary database 134, but may be different than the training data to prevent overfitting. In various implementations, the target text database 136 may be a part of or separate from the database 130 and/or the dictionary database 134. In some instances, the target text database 136 includes data stored in one or more cloud object storage services, such as one or more Amazon Web Services (AWS)-based Simple Storage Service (S3) buckets, or any other desired storage services. In some implementations, all or a portion of the data may be temporarily stored in memory 114 or other database, such as database 130 and/or another suitable data store.

The fine-tuned transformer model 140 may be produced by refining any suitable transformer based model or large language model (LLM) that is pre-trained on a large corpora, such as BERT, RoBERTa, or other sentence transformers, configured for generating contextualized embeddings for input text. For example, the training module 185 may generate the fine-tuned transformer model 140 by refining, i.e., fine-tuning, a pretrained transformer model for specific tasks, such as next sentence prediction, masked word prediction, etc., using a domain specific short text training dataset, which may be stored in the target text database 136, if used for the target text, or in another database, such as database 130. The fine-tuned transformer model 140 is used to generate dictionary data stored in the dictionary database 134 and may be used during the selection of the n-gram length.

The one-layer transformer model 150 may be a light-weight neural network that is trained for short text matching. The one-layer transformer model 150 may include self-attention, a fully connected layer for each attention output, and an activation function, such as ReLU (Rectified Linear Unit) or GELU (Gaussian Error Linear Unit) to introduce non-linearity to improve expressiveness of the model. The one-layer transformer model 150 may include additional components, such as residual connections and layer normalization. The one-layer transformer model 150 may be configured for receiving input embeddings for the query text, target text, and corresponding positional embeddings, and to determine similarity of the text. The one-layer transformer model 150 may produce an output vector representing the results of the text matching, e.g., such as a similarity score, e.g., based on cosine similarity Euclidean distance, or dot product, for a matching task or a probability distribution over classes, "good match," "poor match," quantified probability of matching or not matching, etc., for a classification task. In some implementations, the one-layer transformer model 150 may be trained to handle special out-of-vocabulary (OOV) tokens or embeddings, for query text that is not found in the dictionary database 134. For example, the one-layer transformer model 150 may be additionally trained using a domain specific short text dataset that differs from the training dataset used to fine-tune the transformer model 140.

The transformer model 160 may be configured to produce n-gram tokens of the selected length from input text that includes query text received via the interface 120, and target text received via the target text database 136. The transformer model 160 may be configured to use a sliding window with the selected length to generate a plurality of n-gram tokens from the input text. The transformer model 160, for example, may be configured to format the n-gram tokens with a specific input sequence, e.g., as a single input with the n-gram tokens for the query text and the target text separated with a separator token [SEP], e.g., in a cross-encoder type application, and to pad or truncate the input to a fixed length. The transformer model 160 may be further configured to encode the n-gram tokens, e.g., map the n-gram tokens to numerical input identifiers (IDs). Additionally, the transformer model 160 may be configured to generates positional embeddings that correspond to each n-gram token and indicate the position in the query text and target text for each n-gram token. Additionally, the transformer model 160 may be configured to generates positional embeddings that correspond to each n-gram token and indicate the position in the query text and target text for each n-gram token.

The embedding look-up module 170 may be configured to receiving the input sequence from produced by the transformer model 160 and to search the dictionary database 134 to determine embeddings, e.g., fixed dimensional numeric vectors, for the n-gram tokens. The embedding look-up module 170, for example, may search the keys stored in the dictionary database 134 based on the n-gram tokens from the input sequence to determine the corresponding embeddings from the associated values that are stored in the dictionary database 134. For data that is not found in the dictionary database 134, e.g., n-gram tokens for query text with no corresponding key in the dictionary database 134, the embedding look-up module 170 may be configured to produce an OOV token embedding, such as a vector of zeros.

The matching module 180 may be to provide the token embeddings and positional embeddings, generated via the transformer model 160 and embedding look-up module 170, as input to the one-layer transformer model 150.

The training module 185 is configured for fine tuning a pre-trained transformer model to produce the fine-tuned transformer model 140 for specific tasks, such as next sentence prediction, masked word prediction, etc., using a domain specific short text training dataset stored in the target text database 136 or other database, such as database 130.

The n-gram length selector module 190 is configured to select the n-gram length, e.g., based on the dependency of the variance of embeddings on the n-gram lengths for embeddings of different n-gram lengths produced by the fine-tuned transformer model 140. The n-gram length selector module 190, for example, may be configured to cause the fine-tuned transformer model 140 to generate embeddings for a plurality of n-gram tokens of different lengths for domain specific short text data, e.g., in the training dataset used to train the fine-tuned transformer model 140. The n-gram length selector module 190 may be configured to determine an average variance of the embeddings for each n-gram length, e.g., by determining the variance for each dimension across all embeddings of a particular n-gram length and averaging the variance for that n-gram length across all dimensions. The n-gram length selector module 190 may be configured to select the length, e.g., based on an optimization to minimize ambiguity, e.g., low average variance, and the length of the short text data, which may vary depending on application and specific domain.

The dictionary generation module 195 is configured to generate the dictionary data for the domain specific short text data, e.g., using the transformer model 160 and the fine-tuned transformer model 140. The dictionary generation module 195, for example, may cause the transformer model 160 to produce n-gram tokens of the selected length for all of the domain specific short text data used to train the fine-tuned transformer model 140, and to cause the fine-tuned transformer model 140 to generate embeddings for all of the n-gram tokens, which are then stored in the dictionary database 134, e.g., as keys and values in a hash-map.

The fine-tuned transformer model 140, one-layer transformer model 150, transformer model 160, embedding look-up module 170, matching module 180, training module 185, n-gram length selector module 190, and dictionary generation module 195, as well as other components, are implemented in software, hardware, or a combination thereof. In some implementations, any one or more of the fine-tuned transformer model 140, one-layer transformer model 150, transformer model 160, embedding look-up module 170, matching module 180, training module 185, n-gram length selector module 190, and dictionary generation module 195 is embodied in instructions that, when executed by the processor 110, cause the system 100 to perform operations. In various implementations, the instructions of one or more of said components, the interface 120, the dictionary database 134, and/or target text database 136, are stored in the memory 114, the database 130, or a different suitable memory, and are in any suitable programming language format for execution by the system 100, such as by the processor 110. It is to be understood that the particular architecture of the system 100 shown in FIG. 1 is but one example of a variety of different architectures within which aspects of the present disclosure can be implemented. For example, in some implementations, components of the system 100 are distributed across multiple devices, included in fewer components, and so on. While the below examples related to short text matching are described with reference to the system 100, other suitable system configurations may be used.

Figure 2:
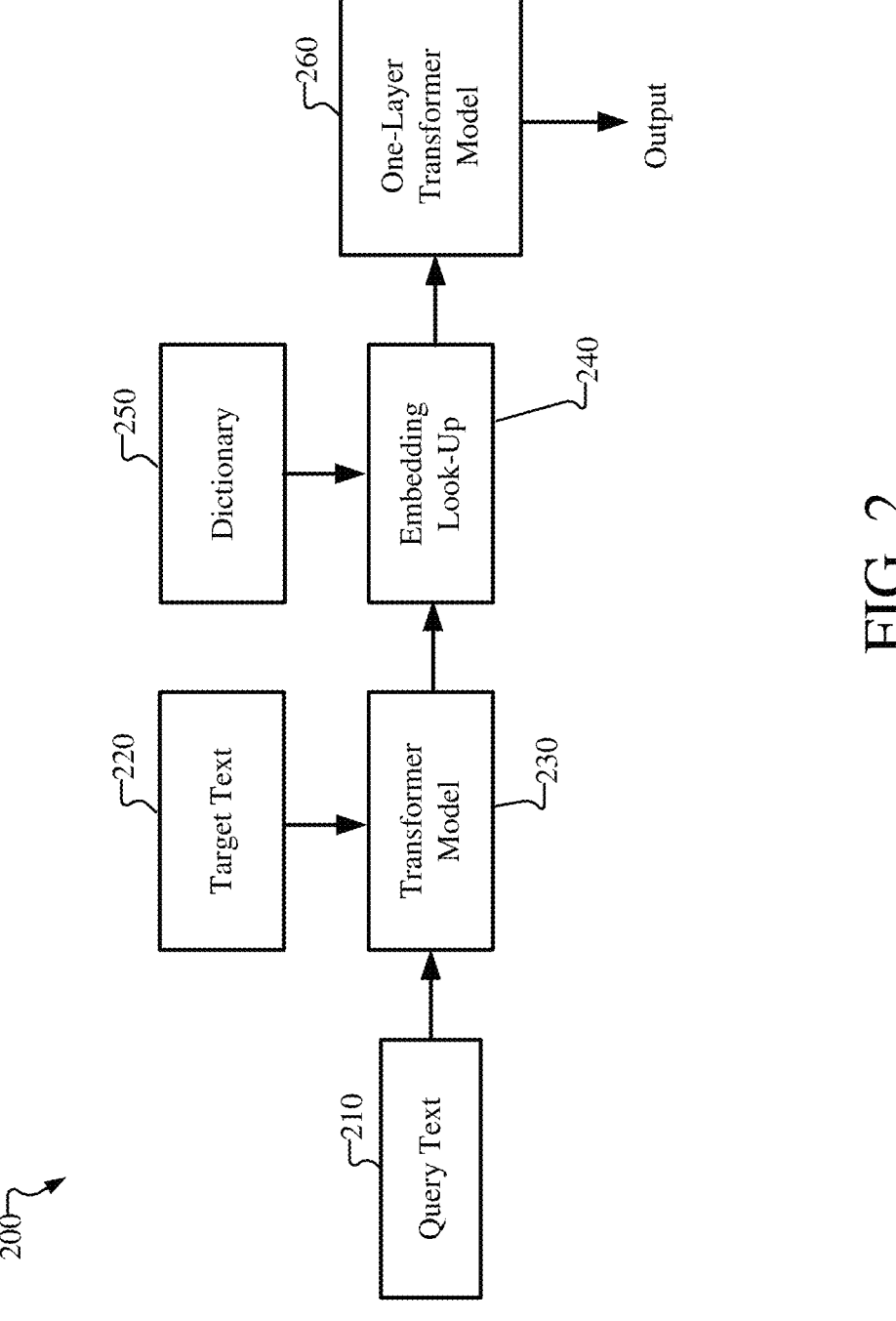
FIG. 2 illustrates an architecture of a system for short text matching, according to some implementations.

FIG. 2 illustrates an example of the architecture of a system 200 for short text matching using a pre-generated dictionary 250 and a one-layer transformer model 260, as discussed in reference to FIG. 1. It should be understood that the architecture of system 200 may include additional components that are not illustrated in FIG. 2. Moreover, it should be understood that architecture of system 200 illustrated in FIG. 2 is generalized and that if desired additional or other components or process steps may be undertaken in various implementations.

As illustrated, domain specific input text is received by the system 200 in the form of query text 210 and target text 220. The query text 210, for example, is short text that is domain specific, e.g., specific to the same domain for which the dictionary 250 is generated. The query text 210 may be a short text query or other data that is generated by a user or separate application and is provided to the system 200, e.g., through interface 120 shown in FIG. 1, to initiate the matching process. The target text 220, for example, is a set of documents, sentences, phrases, or other data, that the query text 210 is to be matched against. The short text, for example, is a concise text segment, such as a query, phrase, or sentence that is limited in length, e.g., less than a designated number of words, characters, or sentences. For example, a short text may be considered text with fewer than a designated number of words, e.g., less than 100, 50, 20, or fewer words. In some implementations, a short text may be considered text with fewer than a designated number of characters, e.g., less than 150, 100, 50, or fewer characters. In some implementations, a short text may be considered text with less than a designated number of sentences or phrases, e.g., two or fewer sentences or phrases. The exact definition of short text may vary depending on the particular application or specific domain, but short text may be generally characterized by brevity, limited context, and potential ambiguity.

The domain specific input text including the query text 210 and the target text 220 are provided to a transformer model 230. The transformer model 230 generates a plurality of n-gram tokens for the query text 210 and target text 220 with a predetermined n-gram length. The predetermined n-gram length may be selected, for example, based on a dependency of a variance in embeddings produced by a fine-tuned transformer model for domain specific short text and the length of the n-gram tokens. In some implementations, the transformer model 230 may use a sliding window approach, in which the window has the selected n-gram length. For example, for a five word input text and a sliding window with a 3-gram length, the resulting 3-gram tokens are $1^{st}$-$3^{rd}$ words, $2^{nd}$-$4^{th}$ words, and $3^{rd}$-$5^{th}$ words. The transformer model 230 formats the input sequence. For example, in some implementations, the query text 210 and the target text 220 may be concatenated as a single input and the transformer model 230 may separate the tokens for n-gram tokens for the query text 210 and the target text 220 using a separator token [SEP] in a cross-encoder type application. The sequence may be padded or truncated to a fixed length (e.g., number of tokens). The transformer model 230 may further encode the n-gram tokens, e.g., by mapping the n-gram tokens to numerical input identifiers (IDs). Additionally, the transformer model 230 generates positional embeddings that correspond to each n-gram token. The positional embeddings, for example, provide an indication of the position in the query text 210 and target text 220, if provided, for each n-gram token. The token embeddings and the positional embeddings may have the same dimensionality, and may be combined by either addition or concatenation.

In another implementation, instead of a cross-encoder type application where the query text 210 and target text are combined into a single input, a bi-encoder type application may be used in which the query text 210 and the target text 220 are treated as separate inputs.

The sequence of encoded n-gram tokens for the query text 210 and the target text 220, along with positional embeddings, is provided to the embedding look-up 240. The embedding look-up 240 is configured to search the dictionary 250 to determine embeddings, e.g., fixed dimensional numeric vectors, for the n-gram tokens. The use of the embedding look-up 240 and dictionary 250 is advantageous as it reduces computational complexity to achieve the high speed inference of context-rich embeddings for the n-gram tokens. The dictionary 250, for example, may be stored in the dictionary database 134 shown in FIG. 1. The dictionary 250 may be generated using a fine-tuned large transformer model, for example, the fine-tuned transformer model 140 shown in FIG. 1, that is fine-tuned using domain specific short text training data. The fine-tuned large transformer model produces embeddings for n-gram tokens of the selected length from domain specific short text data, which may from the same domain or distribution, but is different than the domain specific short text training data. The dictionary 250 may be a hash-map that is built by storing the n-gram tokens, e.g., after encoding, as keys and the corresponding embeddings produced by the fine-tuned large transformer model as values, e.g., in the dictionary database 134. The embedding look-up 240 searches keys in the dictionary 250 using the encoded n-gram tokens for the query text 210 and the target text 220 to determine the corresponding embeddings from the associated values stored in the dictionary 250. For data that is not found in the dictionary 250, e.g., n-gram tokens for query text 210 with no corresponding key in the dictionary 250, is treated as unseen data and an out-of-vocabulary (OOV) embedding, such as a vector of zeros, may be used.

The embeddings for the n-gram tokens for the query text 210 and the target text 220 and positional embeddings are provided to the one-layer transformer model 260. The one-layer transformer model 260 is a simplified transformer model with a single attention layer and enables efficient and accurate text matching. The use of the one-layer transformer model 260 is advantageous as it is a lightweight neural network configured for tasks such as text similarity using a single transformer block reducing computational complexity to achieve efficient and accurate text matching. The one-layer transformer model 260 includes self-attention, where input embeddings for the query text 210, target text 220, and positional embeddings are processed to weigh the importance of each element relative to others, capturing their relationships via multi-head attention. A fully connected layer is applied to each attention output, transforming the representations to enhance feature extraction. An activation function, such as ReLU (Rectified Linear Unit) or GELU (Gaussian Error Linear Unit), introduces non-linearity to improve expressiveness of the model. The one-layer transformer model 260 may include residual connections and layer normalization. In some implementations, the one-layer transformer model 260 may be trained to handle OOV embeddings effectively, e.g., using a second domain specific short text training dataset that is different than the training dataset used to fine tune the transformer model used for building the dictionary 250, i.e., so that the second training dataset includes OOV text. The one-layer transformer model 260 produces an output vector that represents a task-specific representation of the embeddings corresponding to each of the plurality of n-gram tokens and the corresponding positional embeddings, such as similarity score, e.g., based on cosine similarity, Euclidean distance, or dot product, for a matching task or a probability distribution over classes for a classification task.

As discussed above, in a cross-encoder type application, the query text 210 and target text 220 are concatenated by the transformer model 230 and are processed jointly. The process is repeated for all target texts, which produces a highly accurate text matching result. If desired, however, a bi-encoder type application may be used where the query text 210 and target text 220 are treated as separate inputs. For example, the embeddings for the query text 210 and target text 220 may be generated separately using the embedding look-up 240 and dictionary 250 and may be provided to a bi-encoder model in place of the one-layer transformer model 260, which may separately encode each of the query text 210 and target text 220 based on their separate embeddings determined by the embedding look-up 240 and may produce a similarity score, e.g., based on cosine similarity Euclidean distance, or dot product for a matching task.

Figure 3:
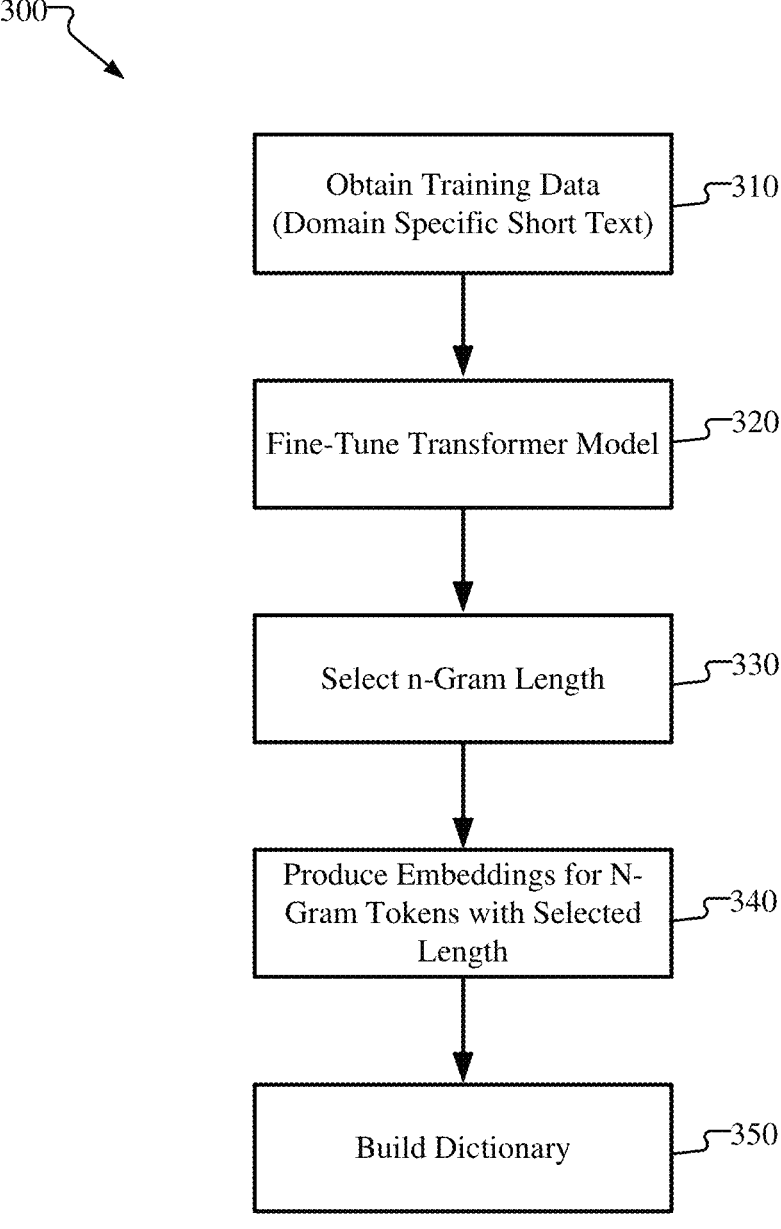
FIG. 3 illustrates a flowchart depicting a method for matching domain specific short text including for generating a dictionary for n-gram tokens of a selected length and corresponding embeddings with a fine-tuned transformer model, according to some implementations.

FIG. 3 illustrates a process flow 300 for generating a dictionary for n-gram tokens of the selected length from domain specific short text data and corresponding embeddings, such as dictionary 250 used in the architecture of system 200 shown in FIG. 2. It should be understood that the process flow illustrated in FIG. 3 is generalized and additional process steps, such as encoding, may be performed.

As illustrated, at 310, a training dataset including domain specific short text is obtained. The training dataset, for example, may be constructed for fine tuning a transformer based model on desired tasks, such as next sentence prediction, masked word prediction, etc., in a specific domain, such as medical, legal, financial, technical, etc. The data for the training dataset, for example, may be collected from public datasets, proprietary datasets, synthetic, etc., or a combination thereof, that are specific to the desired domain and include short text. Once the training data is collected, curated and formatted, the training data may be stored, e.g., in the database 130 or the target text database 136 to be used as the target text.

At 320, a pretrained transformer model, such as BERT, is fine-tuned using the training data, e.g., which may be stored in the target text database 136 or other database, such as database 130. The transformer model is fine-tuned by adapting its pretrained weights to the domain specific training dataset to enhance its performance on desired tasks.

Figure 4:
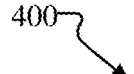
FIG. 4 illustrates a graph of the dependency of embedding variance on n-gram length in embeddings produced by a fine-tuned transformer model.
Figure 4:
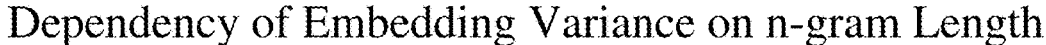
Figure 4:
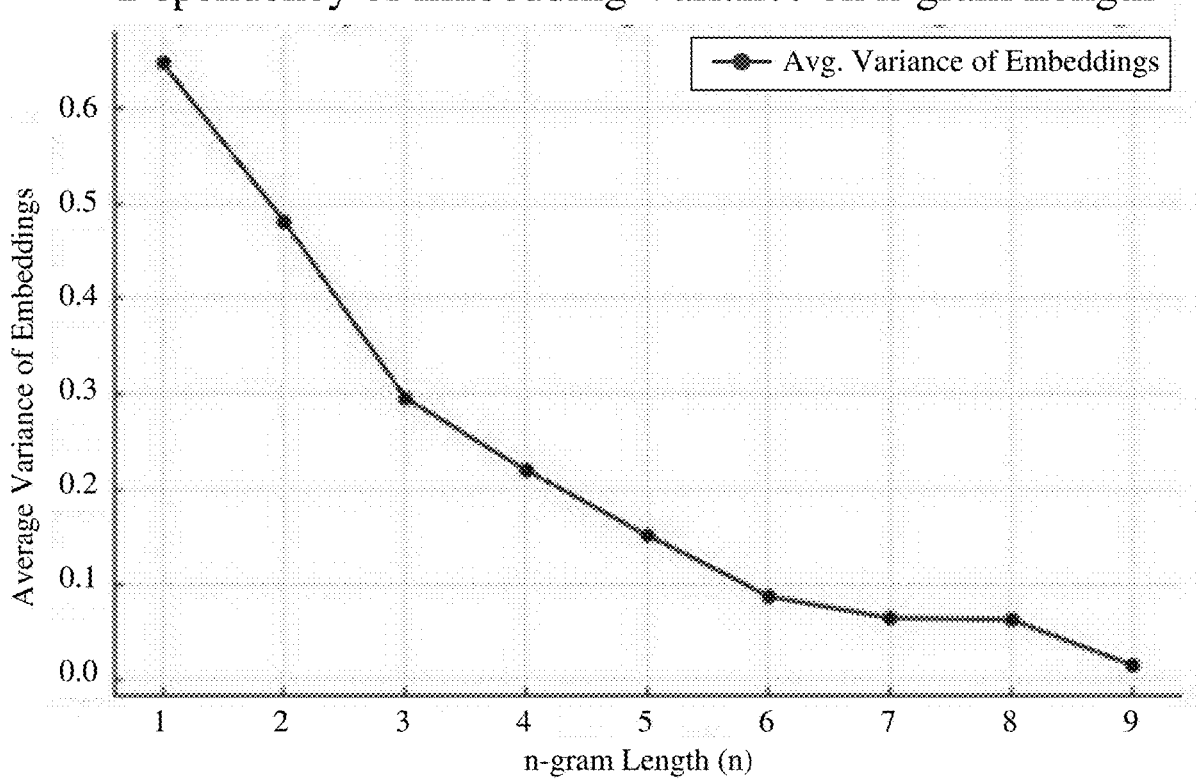

At 330, the n-gram length may be selected. In some implementations, the n-gram length may be selected based on the dependency of the variance in the embeddings produced by the fine-tuned transformer model and length of the n-gram tokens. FIG. 4, by way of example, is a graph 400 illustrating the dependency of embedding variance on n-gram length (n). The fine-tuned transformer model, for example, may generate embeddings for a plurality of n-gram tokens of different lengths from at least a portion of the training dataset. As illustrated in FIG. 4, by way of example, the length of the n-gram tokens may vary from 1 to 9. An average variance of the embeddings for each n-gram length (n) may be determined, e.g., by determining the variance for each dimension across all embeddings of a particular n-gram length and averaging the variance for that n-gram length across all dimensions. The average variance provides an indication of the spread of the embeddings across their dimensions, where a low average variance may indicate that the embeddings are tightly clustered in certain dimensions, while a high average variance may indicate that the embeddings are more spread across its dimensions. The n-gram length may be selected based on the determined dependency of the variance in the embeddings produced by the fine-tuned transformer model and length of the n-gram tokens. While the same length n-gram token in different sentences may have different embeddings from the fine-tuned transformer model, n-gram tokens of certain lengths from the domain specific short text will have sufficiently low ambiguity for specific tasks, e.g., short text matching. Accordingly, the selection of the n-gram length, for example, may be based on an optimization of minimized ambiguity, e.g., low average variance, and length of the short text data, which may vary depending on application and specific domain.

At 340, embeddings for n-gram tokens of the selected length from the training dataset are produced by the fine-tuned transformer model. For example, the transformer model of the fine-tuned transformer model may extract all n-gram tokens of the selected length from at least a portion of the training data, and embeddings for each n-gram token of the selected length is determined using the fine-tuned transformer model.

At 350, the dictionary may be built and stored, e.g., in the dictionary database 134. The dictionary may be built, for example, as a hash-map, where the n-gram tokens are keys and the corresponding embeddings are values.

FIG. 5 shows an illustrative flowchart depicting an example method 500 for matching domain specific short text, as discussed herein. The method 500 is described as a computer-implemented method, e.g., which may be performed by the system 100 illustrated in FIG. 1, e.g., configured with the architecture of system 200 shown in FIG. 2 and further discussed with respect to FIGS. 3 and 4.

At 510, the method includes obtaining training data including domain specific short text data, where domain specific short text includes text with less than a predetermined number of words, characters, or sentences, e.g., as discussed in relation to the interface 120, database 130 or target text database 136 in FIG. 1 and as discussed in block 310 in FIG. 3.

At 520, a transformer model is fine-tuned using the training data including the domain specific short text data to generate a fine-tuned transformer model, e.g., as discussed in relation to the fine-tuned transformer model 140 and training module 185 in FIG. 1 and discussed in block 320 in FIG. 3. In some implementations, fine tuning the transformer model may use tasks such as at least one of next sentence prediction and masked word prediction.

At 530, embeddings are produced for n-gram tokens of a selected length from the domain specific short text data using the fine-tuned transformer model, e.g., as discussed in relation to the fine-tuned transformer model 140 and dictionary generation module 195 in FIG. 1 and discussed in block 340 in FIG. 3.

At 540, a dictionary is built for the n-gram tokens of the selected length from the domain specific short text data and corresponding embeddings produced by the fine-tuned transformer model, where the dictionary is used to look-up embeddings corresponding to each of a plurality of n-gram tokens of the selected length from domain specific input text including query text for matching, e.g., as discussed in relation to the fine-tuned transformer model 140 and dictionary generation module 195, dictionary database 134 in FIG. 1 and discussed in block 350 in FIG. 3. In some implementations, the n-gram tokens are keys and the corresponding embeddings are values in the dictionary.

In some implementations, the selected length is determined based on a dependency of a variance in the embeddings produced by the fine-tuned transformer model and length of the n-gram tokens, e.g., as discussed in relation to the n-gram length selector module 190 in FIG. 1 and discussed in block 330 of FIG. 3 and in reference to FIG. 4.

In some implementations, embeddings for the n-gram tokens of the selected length may be produced by extracting all n-gram tokens of the selected length from the domain specific short text data, and determining embeddings for each of the all n-gram tokens using the fine-tuned transformer model, e.g., as discussed in reference to block 340 of FIG. 3.

In some implementations, the method may further include receiving via an electronic interface the domain specific input text including the query text and target text, e.g., as discussed in relation to the interface 120 in FIG. 1 and query text 210 and target text 220 in FIG. 2. Additionally, the method may include generating the plurality of n-gram tokens of the selected length and corresponding positional embeddings from the domain specific input text using a sliding window with the selected length, e.g., as discussed in relation to transformer model 160 and transformer model 230 shown in FIGS. 1 and 2, respectively. Embeddings corresponding to each of the plurality of n-gram tokens are determined using the dictionary, e.g., as discussed in relation to the embedding look-up module 170 and dictionary database 134 in FIG. 1 and the embedding look-up 240 and dictionary 250 in FIG. 2. Additionally, the method may include determining an output vector representing a task-specific representation of the embeddings corresponding to each of the plurality of n-gram tokens and the corresponding positional embeddings, e.g., discussed in relation to one-layer transformer model 150 and 260 in FIGS. 1 and 2. The output vector, for example, may be one of a similarity score for a matching task or a probability distribution over classes for a classification task. In some implementations, the output vector is determined via a cross-encoder or a bi-encoder.

In some implementations, the output vector is determined by a one-layer transformer model, wherein the one-layer transformer model includes self-attention, fully connected layer, and activation, e.g., discussed in relation to one-layer transformer model 150 and 260 in FIGS. 1 and 2. The one-layer transformer model, for example, may be trained for out-of-vocabulary tokens using training data including a second set of domain specific short text data that is different than the domain specific short text data.

FIG. 6 shows an illustrative flowchart depicting an example method 600 for short text matching using a system utilizing a pre-generated dictionary of n-gram tokens of a selected length and corresponding embeddings from a transformer model fine-tuned with a domain specific short text training dataset and further utilizing a one-layer transformer model as discussed herein. The method 600 is described as a computer-implemented method, e.g., which may be performed by the system 100 illustrated in FIG. 1, e.g., configured with the architecture of system 200 shown in FIG. 2 and further discussed with respect to FIGS. 3 and 4.

At 610, a dictionary is obtained for n-gram tokens of a selected length from domain specific short text data and corresponding embeddings produced by a fine-tuned transformer model that is fine-tuned based on training data including the domain specific short text data, where the domain specific short text includes text with less than a predetermined number of words, characters, or sentences, e.g., as discussed in relation to the dictionary database 134 in FIG. 1, and illustrated by dictionary 250 in FIG. 2. By way of example, the predetermined number of words, characters, or sentences may be less than 100, 50, 20 words, less than 150, 100, 50 characters, or less than 3 or 2 sentences or phrases. In some implementations, the n-gram tokens are keys and the corresponding embeddings are values in the dictionary.

At 620, the method includes receiving domain specific input text including query text received via an electronic interface and target text, e.g., as discussed in relation to the interface 120 in FIG. 1 and query text 210 and target text 220 in FIG. 2.

At 630, a plurality of n-gram tokens of the selected length and corresponding positional embeddings are generated from the domain specific input text using a sliding window with the selected length, e.g., as discussed in relation to transformer model 160 and transformer model 230 shown in FIGS. 1 and 2, respectively.

At 640, embeddings corresponding to each of the plurality of n-gram tokens are determined using the dictionary, e.g., as discussed in relation to the embedding look-up module 170 and dictionary database 134 in FIG. 1 and the embedding look-up 240 and dictionary 250 in FIG. 2.

At 650, a one-layer transformer model generates an output vector representing a task-specific representation of the embeddings corresponding to each of the plurality of n-gram tokens and the corresponding positional embeddings, e.g., discussed in relation to one-layer transformer model 150 and 260 in FIGS. 1 and 2. The one-layer transformer model, for example, may include self-attention, fully connected layer, and activation. The output vector generated by the one-layer transformer model, for example, may be one of a similarity score for a matching task or a probability distribution over classes for a classification task.

In some implementations, the dictionary may be obtained by obtaining training data including the domain specific short text data, and fine-tuning a transformer model using the training data that includes the domain specific short text data to generate the fine-tuned transformer model, e.g., as discussed in blocks 310 and 320 in FIG. 3. Additionally, the dictionary may be obtained by further producing embeddings for n-gram tokens of the selected length from the domain specific short text data using the fine-tuned transformer model, and building the dictionary for the n-gram tokens of the selected length and the corresponding embeddings produced by the fine-tuned transformer model, e.g., as discussed in blocks 340 and 350 in FIG. 3. For example, in some implementations, fine tuning the transformer model may be based on tasks such as next sentence prediction or masked word prediction, or a combination thereof. In some implementations, the selected length may be determined based on a dependency of a variance in the embeddings produced by the fine-tuned transformer model and length of the n-gram tokens, e.g., as discussed in block 330 of FIG. 3 and in reference to FIG. 4. As an example, producing embeddings for the n-gram tokens of the selected length may include extracting all n-gram tokens of the selected length from the domain specific short text data, and determining embeddings for each of the all n-gram tokens using the fine-tuned transformer model, e.g., as discussed in reference to block 340 of FIG. 3.

In some implementations, the method may further include providing an out-of-vocabulary token and a positional embedding corresponding to the out-of-vocabulary token to the one-layer transformer model for any n-gram tokens of the selected length from the domain specific input text that are not included in the dictionary, e.g., as discussed in relation to the embedding look-up module 170 and dictionary database 134 in FIG. 1 and the embedding look-up 240 and dictionary 250 in FIG. 2. The output vector generated by the one-layer transformer model for example, may be a task-specific representation of the out-of-vocabulary token and the positional embedding corresponding to the out-of-vocabulary token. The one-layer transformer model, for example, may be trained for out-of-vocabulary tokens using training data including a second set of domain specific short text data that is different than the domain specific short text data.

As used herein, a phrase referring to "at least one of" a list of items refers to any combination of those items, including single members. As an example, "at least one of: a, b, or c" is intended to cover: a, b, c, a-b, a-c, b-c, and a-b-c.

Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "generating," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The various illustrative logics, logical blocks, modules, circuits, and algorithm processes described in connection with the implementations disclosed herein may be implemented as electronic hardware, computer software, or combinations of both. The interchangeability of hardware and software has been described, in terms of functionality, and illustrated in the various illustrative components, blocks, modules, circuits and processes described above. Whether such functionality is implemented in hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example implementations, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the broadest scope consistent with this disclosure, the principles and the novel features disclosed herein.

What is claimed is:

1. A method for matching domain specific short text, comprising:

obtaining training data comprising domain specific short text data, wherein domain specific short text comprises text with less than a predetermined number of words, characters, or sentences;

fine-tuning a transformer model using the training data comprising the domain specific short text data to generate a fine-tuned transformer model;

producing embeddings for n-gram tokens of a selected length from the domain specific short text data using the fine-tuned transformer model; and building a dictionary for the n-gram tokens of the selected length from the domain specific short text data and corresponding embeddings produced by the fine-tuned transformer model, wherein the dictionary is used to look-up embeddings corresponding to each of a plurality of n-gram tokens of the selected length from domain specific input text comprising query text for matching.

2. The method of claim 1, wherein fine tuning the transformer model uses tasks comprising at least one of next sentence prediction and masked word prediction.

3. The method of claim 1, wherein the selected length is determined based on a dependency of a variance in the embeddings produced by the fine-tuned transformer model and length of the n-gram tokens.

4. The method of claim 1, wherein producing embeddings for the n-gram tokens of the selected length comprises:

extracting all n-gram tokens of the selected length from the domain specific short text data; and determining embeddings for each of the all n-gram tokens using the fine-tuned transformer model.

5. The method of claim 1, wherein the n-gram tokens are keys and the corresponding embeddings are values in the dictionary.

6. The method of claim 1, wherein the method further comprises:

receiving via an electronic interface the domain specific input text comprising the query text and target text;

generating the plurality of n-gram tokens of the selected length and corresponding positional embeddings from the domain specific input text using a sliding window with the selected length;

determining the embeddings corresponding to each of the plurality of n-gram tokens using the dictionary; and determining an output vector representing a task-specific representation of the embeddings corresponding to each of the plurality of n-gram tokens and the corresponding positional embeddings.

7. The method of claim 6, wherein the output vector comprises one of a similarity score for a matching task or a probability distribution over classes for a classification task.

8. The method of claim 6, wherein the output vector is determined via a cross-encoder or a bi-encoder.

9. The method of claim 6, wherein the output vector is determined by a one-layer transformer model, wherein the one-layer transformer model comprises self-attention, fully connected layer, and activation.

10. The method of claim 9, further comprising training the one-layer transformer model for out-of-vocabulary tokens using training data comprising a second set of domain specific short text data that is different than the domain specific short text data.

11. A system for matching domain specific short text, comprising:

one or more processors; and a memory coupled to the one or more processors and storing instructions that, when executed by the one or more processors, cause the system to:

obtain training data comprising domain specific short text data, wherein domain specific short text comprises text with less than a predetermined number of words, characters, or sentences;

fine tune a transformer model using the training data comprising the domain specific short text data to generate a fine-tuned transformer model;

produce embeddings for n-gram tokens of a selected length from the domain specific short text data using the fine-tuned transformer model; and build a dictionary for the n-gram tokens of the selected length from the domain specific short text data and corresponding embeddings produced by the fine-tuned transformer model, wherein the dictionary is used to look-up embeddings corresponding to each of a plurality of n-gram tokens of the selected length from domain specific input text comprising query text for matching.

12. The system of claim 11, wherein execution of the instructions to fine tune the transformer model causes the system to use tasks comprising at least one of next sentence prediction and masked word prediction.

13. The system of claim 11, wherein the selected length is determined based on a dependency of a variance in the embeddings produced by the fine-tuned transformer model and length of the n-gram tokens.

14. The system of claim 11, wherein execution of the instructions to produce embeddings for the n-gram tokens of the selected length causes the system to:

extract all n-gram tokens of the selected length from the domain specific short text data; and determine embeddings for each of the all n-gram tokens using the fine-tuned transformer model.

15. The system of claim 11, wherein the n-gram tokens are keys and the corresponding embeddings are values in the dictionary.

16. The system of claim 11, wherein execution of the instructions to produce embeddings for the n-gram tokens of the selected length causes the system to:

receive via an electronic interface the domain specific input text comprising query text received and target text;

generate the plurality of n-gram tokens of the selected length and corresponding positional embeddings from the domain specific input text using a sliding window with the selected length;

determine the embeddings corresponding to each of the plurality of n-gram tokens using the dictionary; and determining an output vector representing a task-specific representation of the embeddings corresponding to each of the plurality of n-gram tokens and the corresponding positional embeddings.

17. The system of claim 16, wherein the output vector comprises one of a similarity score for a matching task or a probability distribution over classes for a classification task.

18. The system of claim 16, wherein the output vector is determined via a cross-encoder or a bi-encoder.

19. The system of claim 16, wherein the output vector is determined by a one-layer transformer model, wherein the one-layer transformer model comprises self-attention, fully connected layer, and activation.

20. The system of claim 19, wherein execution of the instructions further causes the system to train the one-layer transformer model for out-of-vocabulary tokens using train-ing data comprising a second set of domain specific short text data that is different than the domain specific short text data.

* * * * *